(12) United States Patent
Woischwill et al.

(10) Patent No.: US 12,731,412 B2
(45) Date of Patent: Sep. 8, 2026

(54) BLIND ZONE OBJECT DETECTION

(71) Applicant: GM GLOBAL TECHNOLOGY OPERATIONS LLC, Detroit, MI (US)

(72) Inventors: Christopher G. Woischwill, Bowmanville (CA); Utkarsh Saini, Pickering (CA); Patrick G. G. DiGioacchino, Niagara Falls (CA); Jiri Kral, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 18/596,763

(22) Filed: Mar. 6, 2024

(65) Prior Publication Data

US 2025/0285447 A1 Sep. 11, 2025

(51) Int. Cl.

| | |
|---|---|
| ***G06V 20/58*** | (2022.01) |
| ***G06T 7/60*** | (2017.01) |
| ***G06T 7/70*** | (2017.01) |
| ***G08G 1/16*** | (2006.01) |

(52) U.S. Cl.

CPC ................ *G06V 20/58* (2022.01); *G06T 7/60* (2013.01); *G06T 7/70* (2017.01); *G08G 1/167* (2013.01); *G06T 2207/30261* (2013.01)

(58) Field of Classification Search

CPC .. G06V 20/58; G06T 7/60; G06T 7/70; G06T 2207/30261; G08G 1/167; B60Q 9/00; B60R 1/22; B60R 11/00; B60R 11/04; B60R 2300/802

See application file for complete search history.

(56) References Cited

U.S. PATENT DOCUMENTS

| | | | | |
|---|---|---|---|---|
| 2009/0140881 | A1 | 6/2009 | Sakai | |
| 2011/0051266 | A1 | 3/2011 | Vickrey | |
| 2015/0245017 | A1 | 8/2015 | DiCenso et al. | |
| 2016/0275683 | A1* | 9/2016 | Sakano | H04N 7/181 |
| 2017/0197620 | A1* | 7/2017 | Igarashi | B60W 30/165 |
| 2020/0195837 | A1* | 6/2020 | Miu | G02B 27/0075 |
| 2020/0406747 | A1* | 12/2020 | Sakai | B60R 1/24 |
| 2021/0019914 | A1* | 1/2021 | Lipchin | G06V 10/25 |
| 2021/0086789 | A1* | 3/2021 | Oyama | B60R 1/12 |
| 2022/0118911 | A1* | 4/2022 | Englander | B60R 1/082 |

FOREIGN PATENT DOCUMENTS

| | | |
|---|---|---|
| DE | 102016100729 A1 | 8/2016 |
| DE | 102022132478 A1 | 6/2023 |

* cited by examiner

*Primary Examiner* — Amara Abdi

(74) *Attorney, Agent, or Firm* — Quinn IP Law

(57) ABSTRACT

An object detection system configured for detecting objects within a front blind zone of a vehicle. The object detection system may be configured for determining positional coordinates for a plurality of candidate objects forward of a front fascia of the vehicle, determining a visibility curve for a driver of the vehicle, and identifying each of the candidate objects as one of a visible object or an occluded object based on a comparison of the positional coordinates to the visibility curve.

20 Claims, 4 Drawing Sheets

BLIND ZONE OBJECT DETECTION

INTRODUCTION

The present disclosure relates to object detection systems configured for alerting operators of equipment to occluded objects, such as but not necessarily limited to an object detection system operable for alerting a driver to objects found within a front blind zone of a vehicle.

A driver may be responsible for directing operations of a vehicle to account for objects found within an ambient environment thereof, e.g., the driver may be tasked with adjusting travel or other operation of the vehicle to avoid the objects. While the physical geometries of vehicles may vary widely, some vehicles may be constructed such that the driver is positioned to predominantly face in a generally forward direction, typically with differing structures of the vehicle being located further forward of the driver such that some of those vehicle structures may occlude, obstruct, or otherwise interfere with a field of view of the driver. The vehicle structures within the field of view may produce blind zones around the vehicle whereby an ability of the driver to view the corresponding ambient environment may be limited to the extent the driver may be unable to view objects within the blind zones without adjusting their field of view.

SUMMARY

One aspect of the present disclosure relates to an object detection system configured for alerting a driver to occluded objects found within a front blind zone of a vehicle. The object detection system may be configured for classifying objects detected within a vicinity of the vehicle as occluded objects or visible objects so that alerts generated to draw the attention of the driver toward the objects may be limited to the occluded objects the driver may be unable to see. The capability to limit or avoid alerts for the visible objects may be advantageous in minimizing nuisances and other distractions to the driver when the driver may already have visibility to the associated object.

One aspect of the present disclosure relates to a method for alerting a driver to occluded objects found within a front blind zone of a vehicle. The method may include identifying a plurality of candidate objects within an ambient environment forward of a front fascia of the vehicle, determining positional coordinates for each of the candidate objects relative to the vehicle, determining a visibility curve relative to a forward looking field of view of the driver to represent a visibility boundary between the front blind zone and a visible zone of the ambient environment coinciding with the forward looking field of view, and identifying each of the candidate objects as one of a visible object or an occluded object based on a comparison of the positional coordinates to the visibility curve, optionally with the visible objects having at least a visible portion thereof within the visible zone and the occluded objects having no visible portion within the visible zone and/or an entirety thereof within the front blind zone.

The method may include, in response to identifying one or more of the occluded objects, providing an alert to apprise the driver of a hidden object having been found within the front blind zone.

The method may include providing the alert by activating one or more systems onboard the vehicle to generate at least one of a haptic warning, an auditory, and/or a visual warning.

The method may include, in response to identifying one or more of the visible objects, providing the alert without providing a specific reference or a dedicated callout for the visible objects.

The method may include determining the visibility curve based on relatively comparing an eye position of the driver to a geometry of the vehicle such that the forward looking field of view is centered relative to the eye position and the front blind zone corresponds with sectors of the forward looking field of view obstructed by the geometry.

The method may include determining the visibility curve based on relatively comparing the forward looking field of view to geometries of one or more a hood, a dashboard, an A-pillar, a steering wheel, or other structure of the vehicle forward of the driver such that the front blind zone corresponds with sectors of the forward looking field of view obstructed by one or more of the geometries and the visible zone corresponds with sectors of the forward looking field of view unobstructed by one or more of the geometries.

The method may include determining the positional coordinates based on a longitudinal distance, a lateral distance, and a height separately derived for each of the candidate objects from images of the ambient environment captured with an imaging device included onboard the vehicle.

The method may include the imaging device being a camera having a wide angle view and a focal length, determining a mounting position of camera on the vehicle, and calibrating the positional coordinates based on the wide angle view, the focal length, and the mounting position to facilitate deriving the positional coordinates from the images captured therewith.

The method may include determining a physical height for each of the candidate objects based on bounding boxes derived from the images and geometrically triangulating the longitudinal distance and the lateral distance therewith.

The method may include comparing the physical heights relative to the visibility curve and identifying each of the candidate objects having the physical height above the visibility curve as one of the visible objects.

The method may include generating the visibility curve such that a slope thereof gradually decreases in a forward direction relative to the front fascia.

The method may include determining the longitudinal and/or lateral distances based at least in part on ultrasonic distance measurements taken for the candidate objects with an ultrasonic sensor included onboard the vehicle and image distance measurements derived for the candidate objects from the images.

The method may include defining a relationship between accuracies of the ultrasonic sensor and the imaging device and determining the longitudinal and/or lateral distances based on selectively weighting the ultrasonic and image distance measurements according to the relationship.

One aspect of the present disclosure relates to a computer-readable storage medium having a plurality of non-transitory instructions stored thereon, which, when executed with one or more processors, may be operable for alerting a driver to occluded objects found within a front blind zone of a vehicle. The non-transitory instructions are operable for identifying a plurality of candidate objects within an ambient environment of the vehicle, determining positional coordinates for each of the candidate objects relative to the vehicle, determining a visibility curve for the driver, optionally with the visibility curve including a slope that gradually decreases in a forward direction relative to an upper surface of a front fascia of the vehicle, and identifying each of the candidate objects as one of a visible object or an occluded object based on a comparison of the positional coordinates to the visibility curve.

The non-transitory instructions may be operable for determining an object height for each of the candidate objects and identifying the candidate objects with the object height above the slope as one of the visible objects and the candidate objects with the object height below the slope as one of the occluded objects.

The non-transitory instructions may be operable for determining a plurality of available visibility curves indexed relative to one or more driver characteristics, determining one or more driver attributes of the driver, and selecting the visible curve to correspond with a one of the available visibility curves having the driver characteristics most closely aligned with the driver attributes and/or interpolating between the available curves.

The non-transitory instructions may be operable for determining a plurality of available visibility curves indexed relative to one of a plurality of driver eye heights, measuring with a measurement system onboard the vehicle a current eye height of the driver, and selecting the visible curve to correspond with a one of the available visibility curves having the driver eye height most closely aligned with the current eye height and/or interpolating between the available visibility curves.

One aspect of the present disclosure relates to a vehicle. The vehicle may include a plurality of wheels operable to facilitate movement of the vehicle, a powertrain operable to rotate one or more of the wheels in response to mechanical power generated with an internal combustion engine and/or an electric motor, an imaging system configured for capturing images of an ambient environment forward of a front fascia of the vehicle, and an object detection system. The object detection system may be configured for determining positional coordinates for a plurality of candidate objects forward of the front fascia, determining a visibility curve for an occupant of the vehicle, and identifying each of the candidate objects as one of a visible object or an occluded object based on a comparison of the positional coordinates to the visibility curve. The system may further include an alert system configured for providing an alert having a callout for drawing an attention of the occupant to a closest one of the occluded objects.

The object detection system may be configured for generating the visibility curve to include a shaped contour extending virtually in a forward direction relative to an upper surface of the front fascia and identifying the candidate objects with an object height above the shaped curve as the visible objects and the candidate objects with an object height below the shaped contour as the occluded objects.

The object detection system may be configured for determining the positional coordinates based on a longitudinal distance, a lateral distance, and a height separately derived for each of the candidate objects from the images and determining the object height for each of the candidate objects based on geometrically triangulating the longitudinal distance, the lateral distance, and the height associated therewith.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
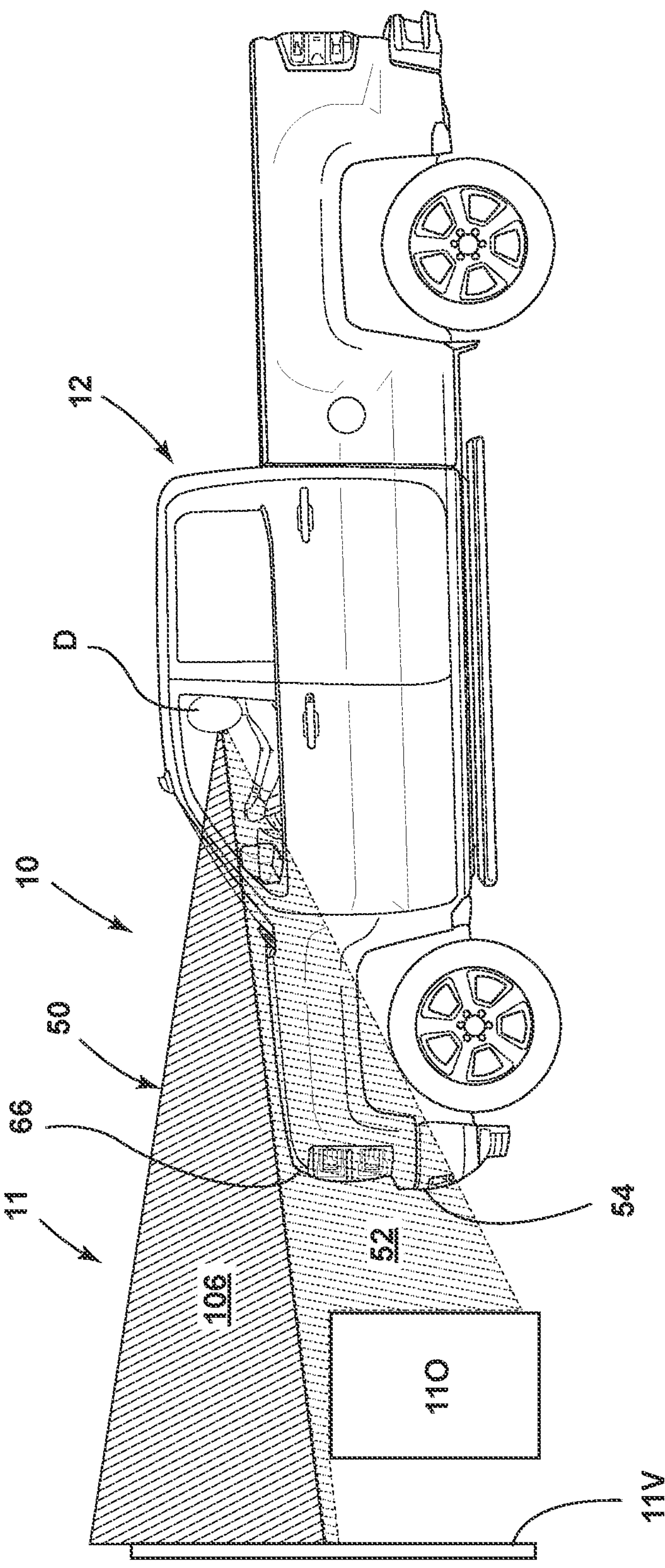
FIG. 1 illustrates an object detection system in accordance with one aspect of the present disclosure.

FIG. 1 illustrates an object detection system 10 in accordance with one aspect of the present disclosure. The object detection system 10 may be configured for identifying and classifying objects 11 detected within a vicinity of a vehicle 12 for purposes of informing a driver D or other system onboard the vehicle 12 of their presence. The vehicle 12 is shown as an automobile for exemplary purposes as the present disclosure fully contemplates the object detection system 10 being similarly beneficial with other types of vehicles, equipment, etc. As shown in the schematic view of FIG. 2, the vehicle 12 may include an electric, traction motor 14 operable for converting electrical power to mechanical power for purposes of performing work, such as for mechanically powering a drivetrain 16 to propel the vehicle 12. The vehicle 12 is illustrated as a hybrid type due to the powertrain 16 optionally including an internal combustion engine (ICE) 18 for generating mechanical power. The vehicle 12 may alternatively omit the electric motor 14 and/or the ICE 18. The powertrain 16 may include componentry to facilitate conveying mechanical, rotative force from the traction motor 14 and/or the ICE 18 to one or more of the wheels 20, 22, 24, 26. The vehicle 12 may include a rechargeable energy storage system (RESS) 30 to store and supply electrical power for the traction motor 14 and/or other components, systems, etc. 32 onboard the vehicle 12, such as via a first bus 34 (e.g., main or HV bus) and a second bus 36 (e.g., auxiliary or LV bus).

The vehicle 12 may include a vehicle controller 38 to facilitate monitoring, controlling, measuring, and otherwise directing operation, performance, etc. onboard the vehicle 12, which may include performing measurements, taking readings, or otherwise collecting data to facilitate operations. The vehicle controller 38 may include additional controllers, with the operations associated therewith optionally being undertaken according to one or more processors executing corresponding non-transitory instructions stored on one or more computer-readable storage mediums. An object detection and alert controller 42 may be included to facilitate directing, controlling, or otherwise facilitating the operations and processes described herein for the object detection system 10. The controller 42 may be configured to interact with other systems, controllers, and features included onboard and/or offboard the vehicle to facilitate alerting a driver, such as via haptic and/or image-based alerts communicated via an infotainment system, a seating system, or other input/output (I/O) interface 44 suitable for providing corresponding interactions with the driver and/or other occupants, operators, or entities within or outside of the vehicle. While predominantly described with respect to alerting the driver D, the present disclosure fully contemplates the object detection system 10 and/or the related controller 42 being operable with an advanced driver assistance system (ADAS), an autonomous driving system, or other systems associated with the vehicle 12. The detected objects 11, object classifications, alerts, etc. may be operable with such systems to facilitate corrective action without necessarily requiring corresponding communication to and/or interaction with the driver.

While the physical geometries may widely vary, the illustrated vehicle may be constructed such that the driver D is positioned to predominantly face in a generally forward direction such that differing structures of the vehicle 12 may occlude, obstruct, or otherwise interfere with the a field of view 50 of the driver D, which is shown for illustrative purposes to generally correspond with a forward looking field of view 50 due to the vehicle 12 being shown as moving in a forward direction. When considered from the driver D perspective, the geometries of the vehicle 12 structures, such as those associated with one or more a hood, a dashboard, an A-pillar, a steering wheel, or other structure of the vehicle 12, particularly those forward of the driver D, may obstruct the field of view 50. The vehicle 12 structures within the field of view 50 may produce related blind zones around the vehicle 12 such that an ability of the driver D to view the corresponding sector of ambient environment may be limited, i.e., the driver D may be unable to view objects within the blind zones without deviating from their normal driving position. By way of example, the present disclosure is predominantly described with respect such that a front blind zone 52 corresponding with sectors of the forward looking field of view 50 forward of a front fascia 54 of the vehicle 12. The driver D may be responsible for directing operations of the vehicle 12 to avoid the objects 11, e.g., the driver D may be tasked with adjusting a direction of travel of the vehicle 12 to avoid the objects 11.

One aspect of the present disclosure contemplates the object detection system 10 detecting objects 11 based on information collected with an imaging device 58 and/or an ultrasonic sensing system 60. The imaging device 58 may be a fisheye camera or other type of recording device having a relatively wide viewing angle and a focal length operable for correspondingly capturing images, video, etc. of area surrounding the vehicle 12. The ultrasonic sensing system 60 or other similar system may include one or more ultrasonic sensors configured for measuring wireless signals reflected from objects 11 in the vicinity of the vehicle 12. The corresponding information collected within the imaging device 58, ultrasonic sensors 60, or other detection devices included onboard the vehicle 12 may be utilized by the controller to identify the objects 11. The object detection system 10 may be configured for classifying the objects 11 as occluded objects 11O or visible objects 11V depending on whether the objects 11 are visible or not visible with the driver's field of view 50, i.e., the occluded objects 11O may correspond with those blocked by the vehicle 12 structures or otherwise positioned within one of the blind zones in the visible objects 11V may correspond with those that may be visible to the driver D. Based on the corresponding classification, the controller 42 may generate alerts to draw the attention of the driver D toward the objects 11, with the alerts optionally being limited to the occluded objects 11O the driver D may be unable to see. The capability to limit or avoid alerts for the visible objects 11V, i.e., the ability to optionally limit the alerts to the occluded objects 11O, may be advantageous in minimizing nuisances and other distractions to the driver D when the driver D may already have or be presumed to have visibility to the visible object 11V.

Figure 2:
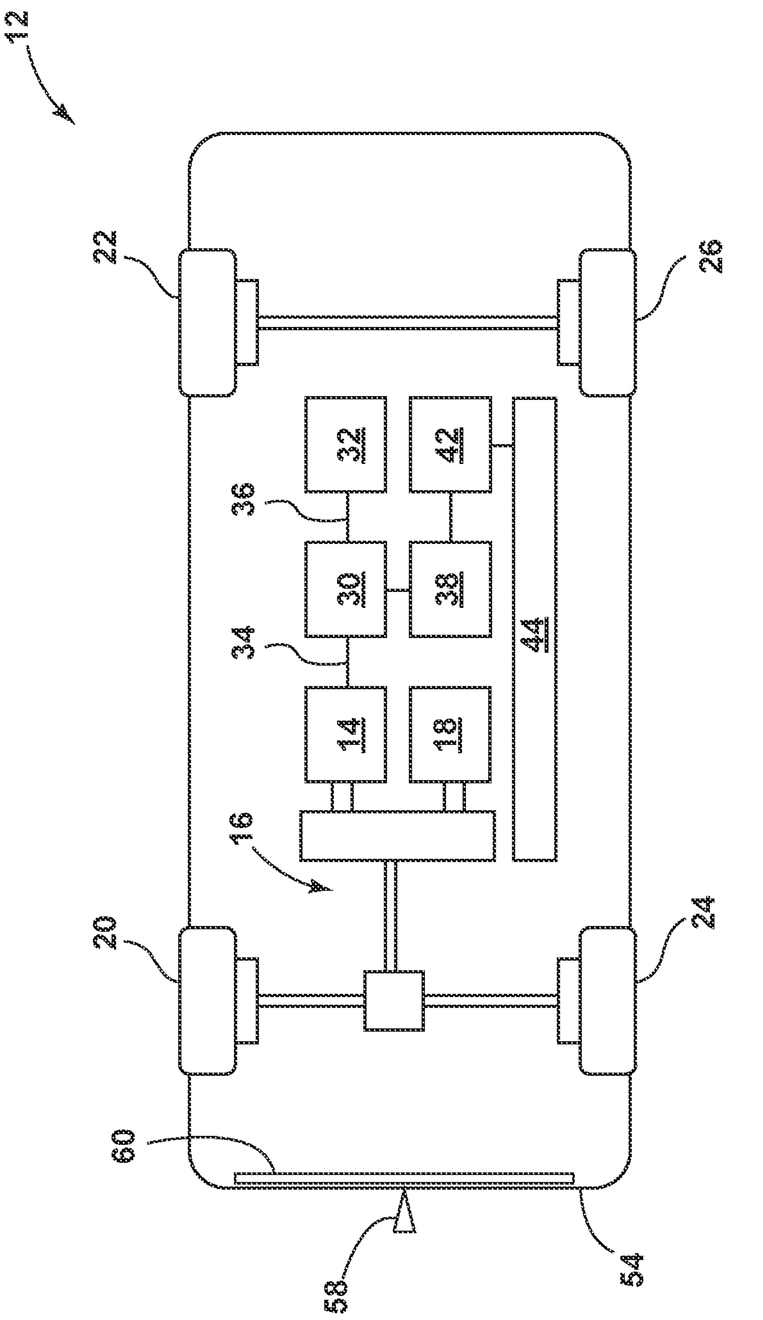
FIG. 2 illustrates a schematic diagram of a vehicle in accordance with one aspect of the present disclosure.
Figure 3:
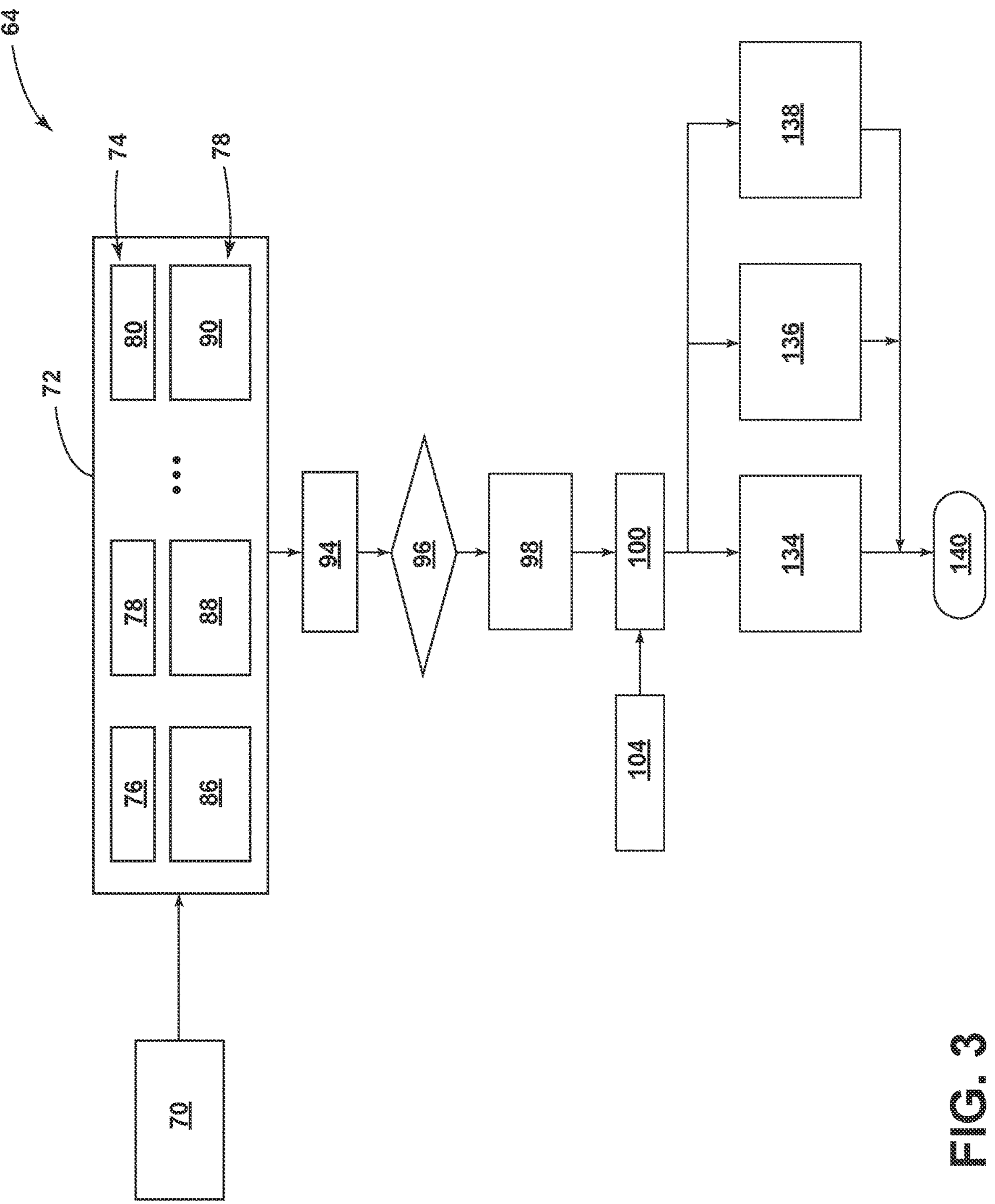
FIG. 3 illustrates a flowchart of a method for detecting and alerting the driver to objects in accordance with one aspect of the present disclosure.

FIG. 3 illustrates a flowchart 64 of a method for detecting and alerting the driver D to objects within the vicinity of the vehicle 12 in accordance with one aspect of the present disclosure. The method may be implemented via the detection and alert controller 42 directing corresponding operations, functions, etc. for the vehicle 12 according to information collected from the object detection system 10 and/or other devices, equipment, sensors, and systems onboard and/or offboard the vehicle 12. The method may be facilitated through one or more processors executing one or more sets of non-transitory instructions stored on a corresponding computer-readable storage mediums. The method is predominantly described with respect to the objects 11 being located within the front blind zone 52 of the vehicle 12, which may generally correspond with an area in front of the vehicle 12 that the driver D may be unable to see due to geometries of various vehicle structures obstructing the driver's field of view 50. As shown in FIG. 1, the front blind zone 52 may correspond with an area of the vehicle 12 forward of and below an upper surface 66 of a front fascia 54. The front fascia 54 may correspond with a front portion of the vehicle 12 having a bumper, forward end of the hood, a grille, or other structure of the vehicle 12, which as shown in FIG. 2, may also include components for the imaging device 58 and/or the ultrasonic sensing system 60. While also beneficial and applicable to other blind zones outside of the vehicle 12, such as a corresponding area at a rear of the vehicle 12 that may be out of view 50 when the vehicle 12 is reversing, the method is described with respect to the front blind zone 52 to address the capabilities of the present disclosure to address a need for deciding when to alert the driver D while traveling in a forward direction, particularly since the driver D may be more susceptible to and sensitive to alerts in general when traveling in a forward direction, at least as compared to a reverse direction when the vehicle 12 may typically be traveling slower, the driver D may be more expectant of alerts, or the ramifications of attracting the driver's attention may be less relevant.

Block 70 may relate to an object detection process whereby the object detection system 10 may detect a plurality of objects 11 within a vicinity of the vehicle 12, such as within an ambient environment forward of the front fascia 54. The object detection process may rely upon identifying objects 11 detected within images captured by the imaging device 58, signals captured with the ultrasonic sensing system 60, and/or through other mechanisms that may be available for object detection, e.g., a vehicle perception system. Block 72 may relate to a candidate selection process whereby one or more of the objects 11 detected in object detection process may be identified as candidate objects 7. The candidate objects may be a subset of the objects 11 detected around the vehicle 12, such as those located forward of the front fascia 54 or within another selected area of interest. The candidate selection process may be used in this manner to filter out other objects detected in other areas of the vehicle 12, e.g., to limit the considered objects of those within a path to travel the vehicle 12 or to eliminate from further processing of those objects that may be inconsequential relative to a current operation of the vehicle 12. The selection process may include an identification process 74 whereby each of the candidate objects, which for non-limiting purposes may be referred to as first object 76, a second object 78, and nth object 80, may be assigned an identification or other differentiator suitable for use in distinguishing one object from another, e.g., the vehicle perception system may be employed to identify and distinguish the candidate objects 76, 78, 80 from each other, such as with an object ID (e.g., a number assigned to the object in a frame), object class (e.g., person, child, car, truck, boat, etc.), bounding box data, and a probability score.

The selection process may include a coordinate process 84 for determining positional coordinates for each of the candidate objects 76, 78, 80, which may correspond with determining first positional coordinates 86 for the first object 76, second positional coordinates 88 for the second object 78, and nth positional coordinates 90 for the nth object 80. The positional coordinates 86, 88, 90 may be generated relative to the vehicle 12, such as relative to the front fascia 54 or other suitable benchmark relative to which the field of view 50 of the driver D may be related, e.g., the positional coordinates 86, 88, 90 may be defined relative to a coordinate system centered at an eye of the driver D. One aspect of the present disclosure contemplates generating the positional coordinates 86, 88, 90 based on a longitudinal distance, a lateral distance, and a height separately derived for each of the candidate objects 76, 78, 80 from images captured with the imaging device 58. The longitudinal and lateral distances, for example, may be determined from mapping capabilities of the imaging device 58 and the height may correspond with a topmost or highest pixel of the associated candidate object relative to a bottom or other reference point in the associated image, e.g., a foot of the object. These values may be geometrical triangulated relative to a position of the imaging camera 58 such that absolute values, such as true physical height of the objects 11, may be determined relative to a desired point within the vehicle 12, e.g., the driver's eye.

In the case of the imaging device 58 being a fisheye, wide-angle, or other type of camera having a predefined or fixed wide angle view and focal length, and based on a mounting position of the fisheye camera on the vehicle 12 being known, the positional coordinates 86, 88, 90 for each of the candidate objects 76, 78, 80 11 may be determined based on the attendant spatial relations therebetween. The imaging device 58 may undergo a calibration process whereby intrinsic properties of the imaging device 58, such as focal length, extrinsic properties, such as mounting height, and camera lens equations may be used to calculate where each finite area or element on the ground plane in front of the camera would appear in an image captured by the camera. For each finite area or element, the longitudinal position of that element may record in a table at the row/column indices corresponding to the pixel coordinates of where that finite area appears in the camera image, which may be thereafter repeated similarly for lateral position. Optionally, the longitudinal and/or lateral distances and/or physical height may be based at least in part on ultrasonic distance measurements taken for the candidate objects 76, 78, 80 with the ultrasonic sensor, such as by defining a relationship between accuracies of the ultrasonic sensor and the imaging device 58 and determining the distances based on selectively weighting the ultrasonic and image distance measurements according to the relationship. The resulting values, for example, may be based on combining a weighted value determined based on the imaging device 58 and a weighted value determined based on ultrasonic sensing system 60.

Block 94 relates to a closest object detection process whereby the controller 42 may determine a closest one of the candidate objects 76, 78, 80 to the front fascia 54. This determination may be beneficial in identifying the object the vehicle 12 is most likely to approach first should the vehicle 12 continue to travel in the same direction and/or the object most likely to reach the vehicle 12 first, e.g., the object may be moving such that the closest object may be temporarily further away from the vehicle 12 than another object but approaching the vehicle 12 at a greater speed. Block 96 relates to a distance assessment process whereby the controller 42 may determine whether the closest one of the candidate objects 76, 78, 80 is within a distance threshold to the vehicle 12. The distance threshold may be a parameter that increases and/or decreases depending on object detection frequency, e.g., the threshold may be increased to reduce noisy activations or hysteresis. In the event the hysteresis threshold is not exceeded, i.e., if it is desirable to undertake further analysis, Block 98 may relate to a finalization process whereby the controller 42 may finalize the candidate objects 76, 78, 80 desired for further blind zone assessment. Block 100 relates to a visibility process whereby the controller 42 may classify each of the candidate objects 76, 78, 80 finalized for assessment according to driver D visibility, e.g., whether the corresponding candidate object is within or outside of the front blind zone 52 and/or other blind zone under consideration. The objects 11 determined to be visible may be characterized as visible objects 11V and the objects 11 determined to be occluded, i.e., those having no visible portion, may be characterized as occluded objects 11O.

Figure 4:
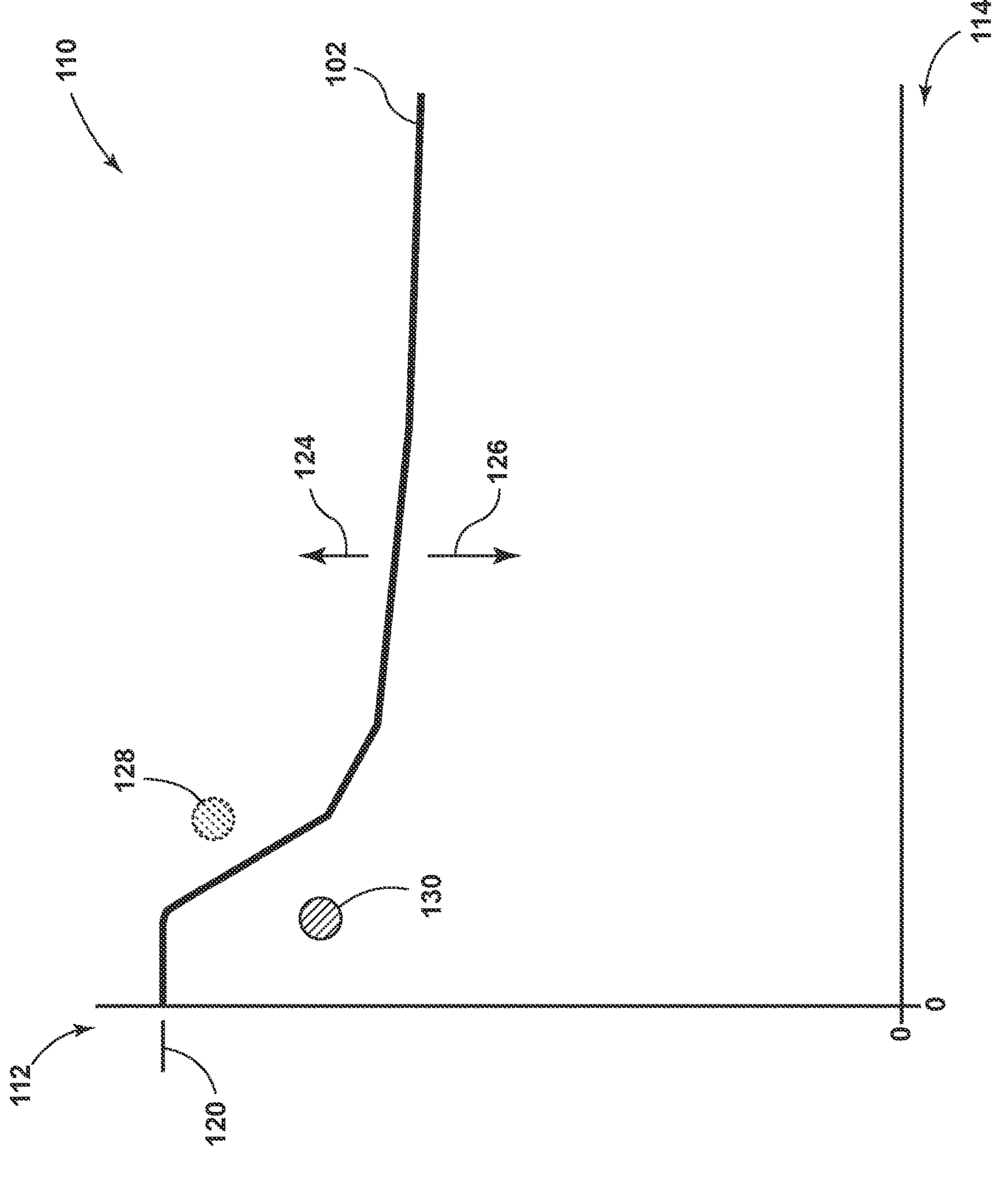
FIG. 4 illustrates a graph of a visibility curve in accordance with one aspect of the present disclosure.

The visibility process may include identifying each of the candidate objects 76, 78, 80 as one of the visible or occluded objects 11O based on a comparison of the positional coordinates 86, 88, 90 associated therewith relative to a visibility curve 102 of the driver D, which may be generated in a visibility curve process of Block 104. The controller 42 may be configured to correspondingly generate the visibility curve 102 for the driver D that may be sufficient for representing a visibility boundary between the front blind zone 52 and a visible zone 106 (see FIG. 1) or an area of the ambient environment within the field of view 50 of the driver D. FIG. 4 illustrates a graph 110 of a visibility curve 102 in accordance with one aspect of the present disclosure. The graph 110 may include a vertical axis 112 representing vertical height and a horizontal axis 114 representing longitudinal distance, which may be defined relative to the front fascia 54 or other reference point associated with a forward portion of the vehicle 12. The visibility curve 102 is shown relative to vertical height for presentation simplicity as the visibility curve 102 may include a lateral shape, e.g., a z-axis may define a lateral shape of the visibility curve 102. The visibility curve 102 may be considered as visibility surface, three-dimensional (3D) shape, etc. that may vary longitudinally and/or laterally relative to the field of view 50. A top of the hood 66 or other uppermost or forward most obstruction within the field of view 50, for example, may correspond with a highest point 120 of the visibility curve 102 whereafter a shaped contour of the visibility curve 102 may virtually extend and vary in proportion to sectors or areas of the ambient environment viewable to the driver D. The visibility curve 102 may generally slope in a downward manner as it stretches beyond the front fascia 54 due the driver D likely experiencing less obstructions when viewing areas farther beyond the vehicle 12. One aspect of the present disclosure contemplates generating a plurality of available visibility curves to account for different classes of drivers D and/or determining individualized visibility curves for each driver D registered or otherwise associated with a particular vehicle. The available visibility curves, for example, may be indexed relative to driver D characteristics, such as driver eye heights, such that upon activating the vehicle 12, corresponding driver D attributes of the current driver D may be determined and used to select the visible curve 102 of the available visibility curves having the driver D characteristics most closely aligned with the driver D attributes, i.e., current eye height of the driver D, and/or interpolating between the available visibility curves to matches or adjust the available curves to the driver D.

The visibility curve 102 may be generated such that an area 124 above the visibility curve 102 may be considered as a visible area, i.e., a portion of the ambient environment visible to the driver D, and an area below 126 the visibility curve 102 may be considered as an occluded area, i.e. an area obstructed or otherwise blocked from driver D view. The candidate objects 76, 78, 80 having a physical height above the visibility curve 102, such as an illustrated first object 128, may be characterized as one of the visible objects 11V and those with the physical height below the visibility curve 102, such as an illustrated second object 130, may be characterized as one of the occluded objects 11O. A similar analysis may be performed for each additional one of the candidate objects 76, 78, 80 such that a result of the visibility process may include no visible objects 11V, i.e., classify each of the candidate objects 76, 78, 80 as occluded objects 11O, a mixture of visible and occluded objects 11V, 11O, or no occluded objects 11O, i.e., classify each of the candidate objects 76, 78, 80 as visible objects 11V. The result, i.e., a classification of each of the candidate objects 76, 78, 80 as being a visible object 11V or an occluded object 11O may be provided to systems onboard and/or offboard the vehicle 12 for additional use. The present disclosure envisions a wide variety of possibilities and enhancements becoming available for use in facilitating operations of vehicle based on the advantageous capabilities of the present disclosure enabling the differentiation of visible objects 11V and occluded objects 11O.

Block 134 relates to a full visibility alert process undertaken in response to determining each of the candidate objects 76, 78, 80 to be visible objects 11V. The full visibility alert process may include the detection and alert controller 42 providing an alert sufficient for apprising dependent systems of each of the candidate objects 76, 78, 80 being characterized as visible objects 11V. The alert may result in taking no action in warning the driver D or otherwise providing the driver D a callout to the visible objects 11V due to at least a portion thereof being within the driver's field of view 50. Block 136 relates to a full occluded alert process undertaken in response to determining each of the candidate objects 76, 78, 80 to be occluded objects 11O. The full occluded alert process may include the detection and alert controller 42 providing an alert sufficient for apprising the driver D of a hidden object has been found within the front blind zone 52. The full occluded alert may include activating one or more systems onboard the vehicle 12 to generate a haptic, an auditory, and/or a visual warning. The warning may include vibrating a seat of the driver D and/or providing a chime, and the warning may include activating heads-up display or video display to provide a specific reference or dedicated callout to draw the driver's attention towards the occluded objects 11O, which may optionally be focused on a limited to a close as one of the occluded objects 11O due to that object likely reaching the vehicle 12 before the other occluded objects 11O. Block 138 relates to a mixed alert process undertaken in response to determining a portion the candidate objects 76, 78, 80 to be visible objects 11V in a portion of the candidate objects 76, 78, 80 to be occluded objects 11O. The mixed alert may include activating one or more systems onboard the vehicle 12 to generate a visual warning, which may include activating heads-up display or video display to provide a specific reference or dedicated callout to draw the driver's attention towards the occluded objects 11O or a closest one thereof. The present disclosure contemplates a wide variety of alerts, warnings, etc. being provided, and as such the preceding are presented for non-limit purposes, which may include limiting the alerts, warnings, etc. so as to avoid inundating the driver D with alerts, which may include options limiting specific alerts or callouts to certain objects to those objects determined to be occluded objects 11O. Block 140 relates to the object detection system 10 continuing the foregoing method as the vehicle 12 continues to travel.

As supported above, one aspect of the present disclosure addresses the problem of a vehicle typically having a large blind spot in front of the vehicle due to its shape and height by alerting the driver and automatically presenting a camera view of the area in front of the vehicle if an object of interest in front of the vehicle is not visible to the driver. The described detection and alert method may be used to generate a real-time estimate of the size of the front blind zone using the geometry of the vehicle and the location of the driver's eyes. Using this information, in conjunction with accurately estimating the position of an object, the system may determine whether an object is visible to the driver and issue an alert to the driver accordingly.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for alerting a driver to one or more occluded objects found within a front blind zone of a vehicle, the method comprising:

identifying a plurality of candidate objects within an ambient environment forward of a front fascia of the vehicle;

determining positional coordinates for each of the candidate objects relative to the vehicle;

determining a visibility curve relative to a forward looking field of view of the driver, the visibility curve representing a visibility boundary between the front blind zone and a visible zone of the ambient environment coinciding with the forward looking field of view, wherein determining the visibility curve includes comparing a driver eye position of the driver to a vehicle geometry of the vehicle such that the forward looking field of view is centered relative to the driver eye position and the front blind zone corresponds with sectors of the forward looking field of view obstructed by the vehicle geometry; and identifying each of the candidate objects as one of a visible object or an occluded object based on a comparison of the positional coordinates to the visibility curve, each of the visible objects having at least a visible portion thereof within the visible zone, and each of the occluded objects having no portion thereof within the visible zone and/or an entirety thereof within the front blind zone.

2. The method according to claim 1, further comprising:

in response to identifying one or more of the candidate objects as the occluded objects, providing an alert to apprise the driver of a hidden object having been found within the front blind zone of the vehicle.

3. The method according to claim 2, wherein providing the alert includes activating one or more systems onboard the vehicle to generate a haptic warning, an auditory warning, and/or a visual warning.

4. The method according to claim 2, further comprising:

in response to identifying one or more of the candidate objects as the visible objects, providing the alert to the driver without providing a specific reference or a dedicated callout for the visible objects.

5. The method according to claim 1, wherein determining the visibility curve includes comparing the forward looking field of view of the driver to geometries of a hood, a dashboard, an A-pillar, a steering wheel, and/or other structure of the vehicle forward of the driver such that the front blind zone corresponds with sectors of the forward looking field of view obstructed by the geometries of the vehicle and the visible zone corresponds with sectors of the forward looking field of view unobstructed by the geometries of the vehicle.

6. The method according to claim 1, wherein determining the positional coordinates is based on a longitudinal distance, a lateral distance, and a height separately derived for each of the candidate objects from images of the ambient environment captured with an imaging device included onboard the vehicle.

7. The method according to claim 6, wherein the imaging device is a camera having a wide angle view and a focal length, the method further comprising:

determining a mounting position of camera on the vehicle; and calibrating the positional coordinates for each of the candidate objects based on the wide angle view, the focal length, and the mounting position to facilitate deriving the positional coordinates from the images captured by the camera.

8. The method according to claim 6, further comprising:

determining a physical height for each of the candidate objects based on bounding boxes derived from the images and geometrically triangulating the longitudinal distance and the lateral distance therewith.

9. The method according to claim 8, further comprising:

comparing the physical heights for each of the candidate objects to the visibility curve, wherein each of the candidate objects having the physical height above the visibility curve is identified as one of the visible objects.

10. The method according to claim 9, further comprising:

generating the visibility curve such that a slope thereof gradually decreases in a forward direction relative to the front fascia.

11. The method according to claim 10, further comprising:

determining the longitudinal and/or lateral distances based at least in part on ultrasonic distance measurements taken for the candidate objects with an ultrasonic sensor included onboard the vehicle and image distance measurements derived for the candidate objects from the images.

12. The method according to claim 11, further comprising:

defining a relationship between accuracies of the ultrasonic sensor and the imaging device; and selectively weighting the ultrasonic and image distance measurements according to the relationship, wherein determining the longitudinal and/or lateral distances for the candidate objects is based on the selectively weighted ultrasonic and image distance measurements.

13. A computer-readable storage medium having a plurality of non-transitory instructions stored thereon, which, when executed with one or more processors, are operable for alerting a driver to occluded objects found within a front blind zone of a vehicle, wherein the non-transitory instructions are operable for:

identifying a plurality of candidate objects within an ambient environment of the vehicle;

determining positional coordinates for each of the candidate objects relative to the vehicle;

determining a visibility curve for the driver, the visibility curve including a slope that gradually decreases in a forward direction relative to an upper surface of a front fascia of the vehicle; and identifying each of the candidate objects as one of a visible object or an occluded object based on a comparison of the positional coordinates to the visibility curve.

14. The computer-readable storage medium according to claim 13, wherein the non-transitory instructions are further operable for:

determining an object height for each of the candidate objects; and identifying the candidate objects with the object height above the slope as one of the visible objects and the candidate objects with the object height below the slope as one of the occluded objects.

15. The computer-readable storage medium according to claim 13, wherein the non-transitory instructions are further operable for:

determining a plurality of available visibility curves each indexed relative to one or more driver characteristics;

determining one or more driver attributes of the driver; and selecting the visible curve to correspond with one of the available visibility curves having the one or more driver characteristics most closely aligned with the one or more driver attributes or interpolating the available visibility curves to match the driver.

16. The computer-readable storage medium according to claim 13, wherein the non-transitory instructions are further operable for:

determining a plurality of available visibility curves each indexed relative to one of a plurality of driver eye heights;

measuring, with a measurement system onboard the vehicle, a current eye height of the driver; and selecting the visible curve to correspond with one of the available visibility curves having the driver eye height most closely aligned with the current eye height.

17. A vehicle, comprising:

a plurality of wheels operable to facilitate movement of the vehicle;

a powertrain operable to rotate one or more of the wheels in response to mechanical power generated with an internal combustion engine and/or an electric motor;

an imaging system configured for capturing images of an ambient environment forward of a front fascia of the vehicle;

an object detection system configured for:

determining positional coordinates for a plurality of candidate objects forward of the front fascia of the vehicle, determining object heights for the candidate objects;

determining a visibility curve for an occupant of the vehicle, the visibility curve including a shaped contour extending virtually in a forward direction relative to an upper surface of the front fascia of the vehicle; and identifying each of the candidate objects as one of a visible object or an occluded object based on a comparison of the positional coordinates of the candidate objects to the visibility curve of the occupant, wherein each of the candidate objects having the object height above the shaped curve is identified as one of the visible objects, and each of the candidate objects having the object height below the shaped contour is identified as one of the occluded objects; and an alert system configured for providing an alert having a callout for drawing an attention of the occupant to a closest one of the occluded objects.

18. The vehicle according to claim 17, wherein the object detection system is further configured for:

determining the positional coordinates based on a longitudinal distance, a lateral distance, and a height separately derived for each of the candidate objects from the images; and determining the object height for each of the candidate objects based on geometrically triangulating the longitudinal distance, the lateral distance, and the height associated therewith.

19. The vehicle according to claim 17, wherein determining the visibility curve includes comparing a driver eye position of the driver to a vehicle geometry of the vehicle such that the forward looking field of view is centered relative to the driver eye position and the front blind zone corresponds with sectors of the forward looking field of view obstructed by the vehicle geometry.

20. The vehicle according to claim 17, wherein determining the visibility curve includes comparing the forward looking field of view of the driver to geometries of a hood, a dashboard, an A-pillar, a steering wheel, and/or other structure of the vehicle forward of the driver such that the front blind zone corresponds with sectors of the forward looking field of view obstructed by the geometries of the vehicle and the visible zone corresponds with sectors of the forward looking field of view unobstructed by the geometries of the vehicle.

* * * * *